US007454743B2

(12) United States Patent
Fuchs

(10) Patent No.: US 7,454,743 B2
(45) Date of Patent: Nov. 18, 2008

(54) JAVA TO SNMP MIB MAPPING

(75) Inventor: Daniel Fuchs, Grenoble (FR)

(73) Assignee: Sun Microsystems, Inc., Santa Clara, CA (US)

(*) Notice: Subject to any disclaimer, the term of this patent is extended or adjusted under 35 U.S.C. 154(b) by 1051 days.

(21) Appl. No.: 10/328,756

(22) Filed: Dec. 23, 2002

(65) Prior Publication Data

US 2003/0177477 A1 Sep. 18, 2003

Related U.S. Application Data

(60) Provisional application No. 60/343,612, filed on Dec. 28, 2001.

(51) Int. Cl.
*G06F 9/44* (2006.01)

(52) U.S. Cl. ........................ 717/108; 717/106; 717/107; 717/116; 717/118; 717/120; 717/123

(58) Field of Classification Search ........................ None
See application file for complete search history.

(56) References Cited

U.S. PATENT DOCUMENTS

| | | | | |
|---|---|---|---|---|
| 6,028,888 | A | 2/2000 | Roux | |
| 6,061,721 | A * | 5/2000 | Ismael et al. | 709/223 |
| 6,226,788 | B1 * | 5/2001 | Schoening et al. | 717/107 |
| 6,915,324 | B1 * | 7/2005 | Allavarpu et al. | 709/200 |
| 2002/0156929 | A1 * | 10/2002 | Hekmatpour | 709/310 |
| 2002/0174091 | A1 * | 11/2002 | Froyd et al. | 707/1 |
| 2003/0093551 | A1 * | 5/2003 | Taylor et al. | 709/237 |
| 2003/0163597 | A1 * | 8/2003 | Hellman et al. | 709/316 |

FOREIGN PATENT DOCUMENTS

| | | |
|---|---|---|
| EP | 1087582 | 3/2001 |
| EP | 1187412 | 3/2002 |
| WO | 01/50631 | 7/2001 |

* cited by examiner

*Primary Examiner*—Chuck O Kendall
(74) *Attorney, Agent, or Firm*—Robert C. Kowert; Meyertons, Hood, Kivlin, Kowert & Goetzel, P.C.

(57) ABSTRACT

A mapping engine, capable of receiving descriptions of manageable software objects in a first language, for generating management information in a second language. The mapping engine is further capable of generating a set of mapping metadata, corresponding to the management information as generated. The mapping engine may be further responsive to user input. In another embodiment, a metadata compiler is provided, capable of receiving management information in a second language, and corresponding mapping metadata, for generating compiled metadata, applicable when using said management information in a first language. The metadata compiler may be used in connection with the above first aspect.

25 Claims, 7 Drawing Sheets

JAVA TO SNMP MIB MAPPING

This application claims the benefit of U.S. Provisional Application No. 60/343,612, filed Dec. 28, 2001.

This invention relates to the software management technology.

JMX (Java Management Extension) may be viewed as a model agnostic technology that makes it possible to plug in remote management to a Java application. It is described in the JMX specification, and also in patent publication WO 00/77631.

The Java Management Extension (JMX) provides a means to make application objects independent from the protocol from which they will be accessed for management.

The management interface of an application may be defined by specifying Java Management Beans (MBeans), that will be registered inside an MBeanServer. A series of connectors and/or adaptors can be plugged into the MBeanServer, making the adaptation between the management protocol and the MBeanServer interface. The Management Beans can thus be accessed transparently from one protocol or another. All the adaptation logic is contained in the connectors/or adaptors, not in the MBeans, which are thus effectively decoupled from the protocols.

However, there still exists some difficulties. For example, some protocols, like SNMP, require some glue-code to be generated in order to provide the adaptation. Such glue-code comprises e.g. metadata, i.e. information about the structure of the objects described in the management interface.

Also, it is desirable that the final application code keep substantially no trace of the management protocol which has been used to obtain it. Until now, this may be obtained only through some type of hand-coding, which results into an impossibility to perform instant management.

In an aspect, one embodiment proposes:

- a mapping engine, capable of receiving descriptions of manageable software objects in a first language, for generating management information in a second language,
- said mapping engine being further capable of generating a set of mapping metadata, corresponding to the management information as generated.

The mapping engine may be further responsive to user input.

In another embodiment, a metadata compiler is provided, capable of receiving management information in a second language, and corresponding mapping metadata, for generating compiled metadata, applicable when using said management information in a first language. The metadata compiler may be used in connection with the above first aspect.

Each of the above aspects and their combinations may be in turn arranged as a software management tool using the management information and the metadata.

In still another embodiment, a method of managing an object oriented software application which uses a first language is provided. The method may comprise:

a. creating management information in a second language, from descriptions of application software objects in the first language, b. creating metadata mapping information for said management information, and c. loading data derived from the metadata mapping information into the object oriented software application using the first language.

The method may also be supplemented to include the above identified features.

Other alternative features and advantages of the invention will appear in the detailed description below and in the appended drawings, in which.

Figure 3:
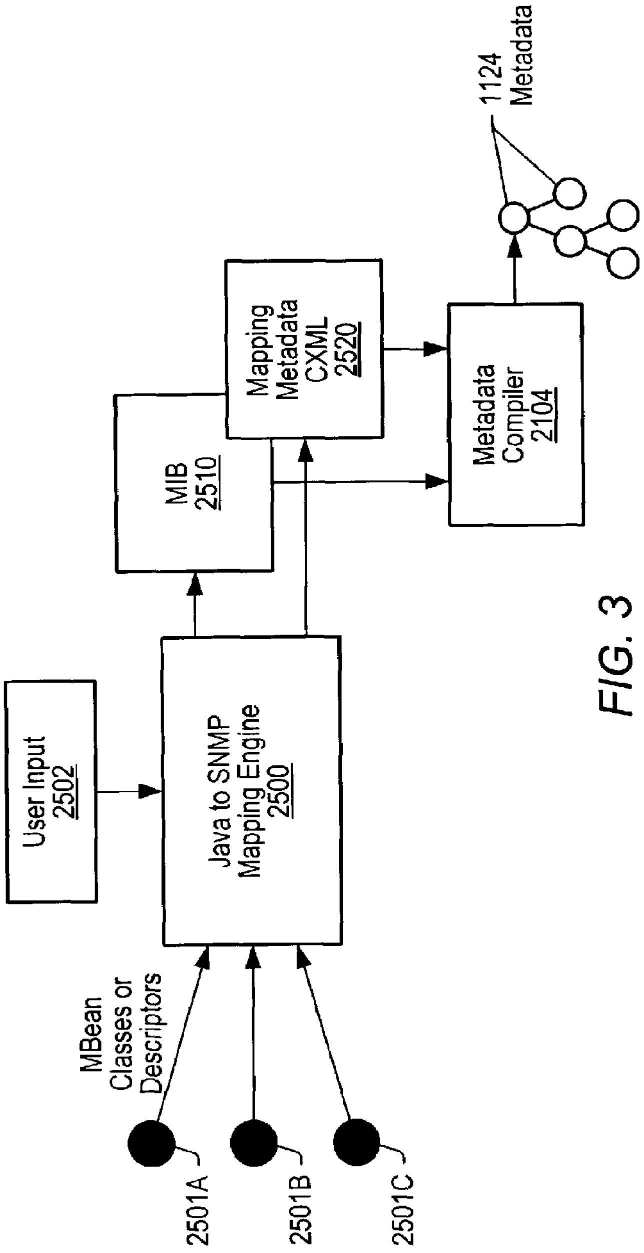
FIG. 3 illustrates an exemplary implementation of a management protocol adaptor for a JMX framework, in accordance with this invention.
Figure 6:
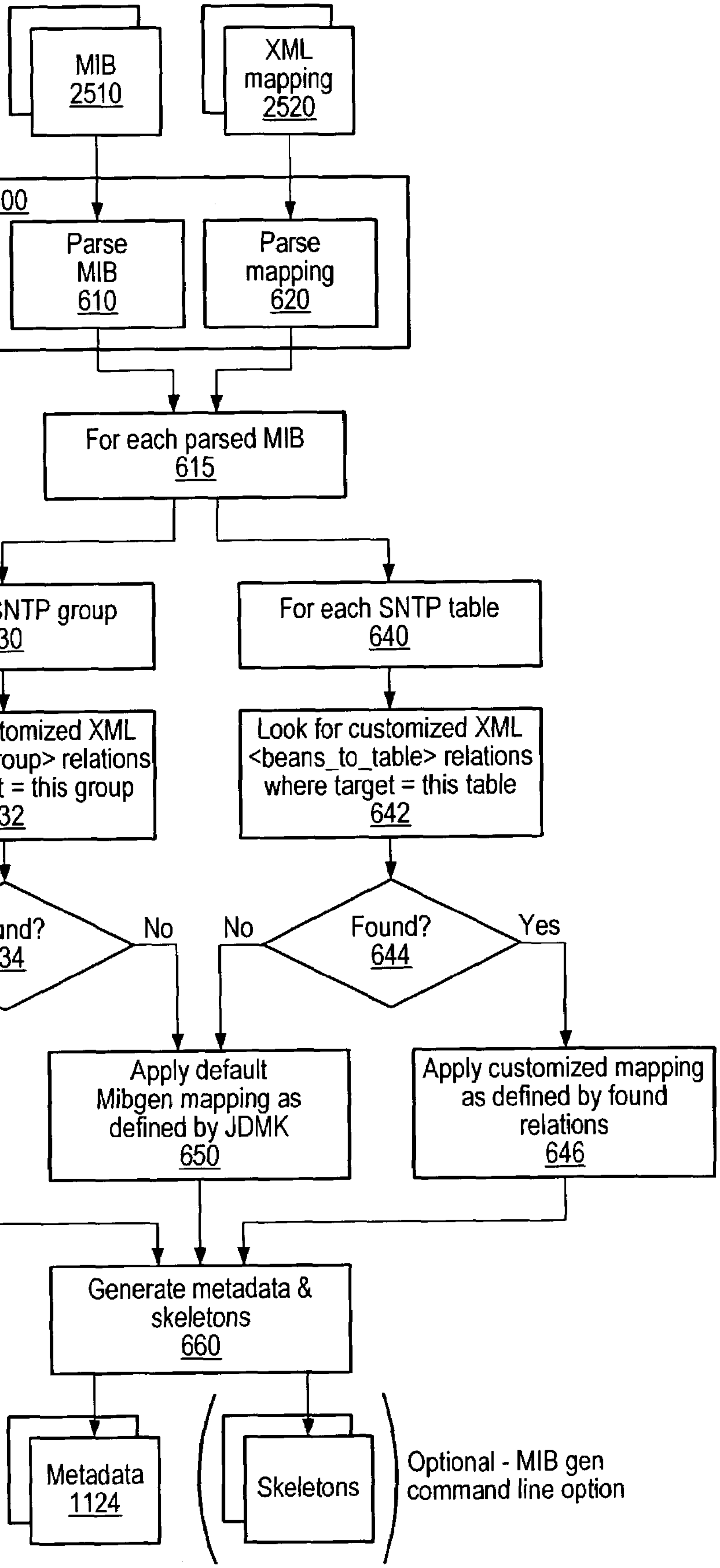
Figure 7:
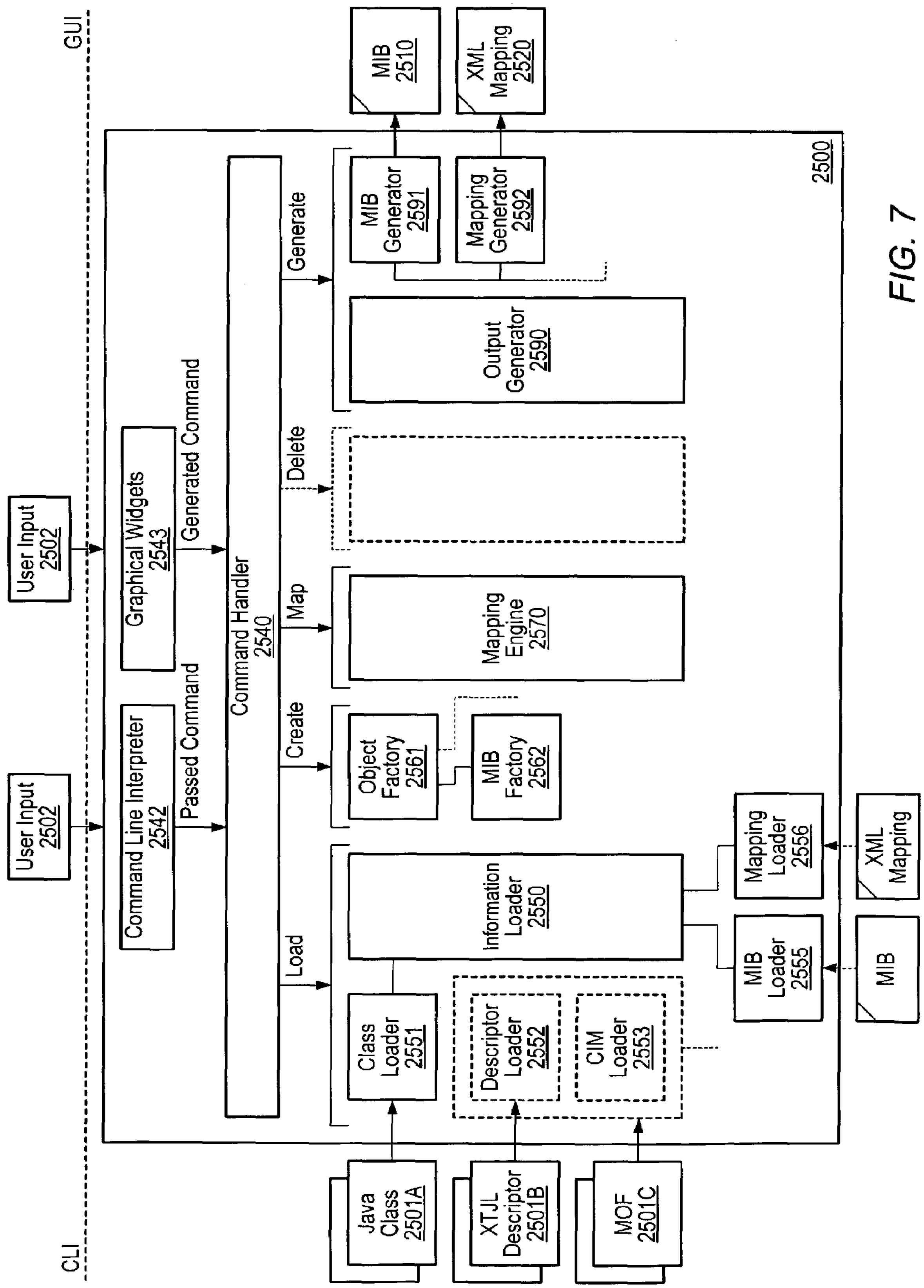
Figure 8:
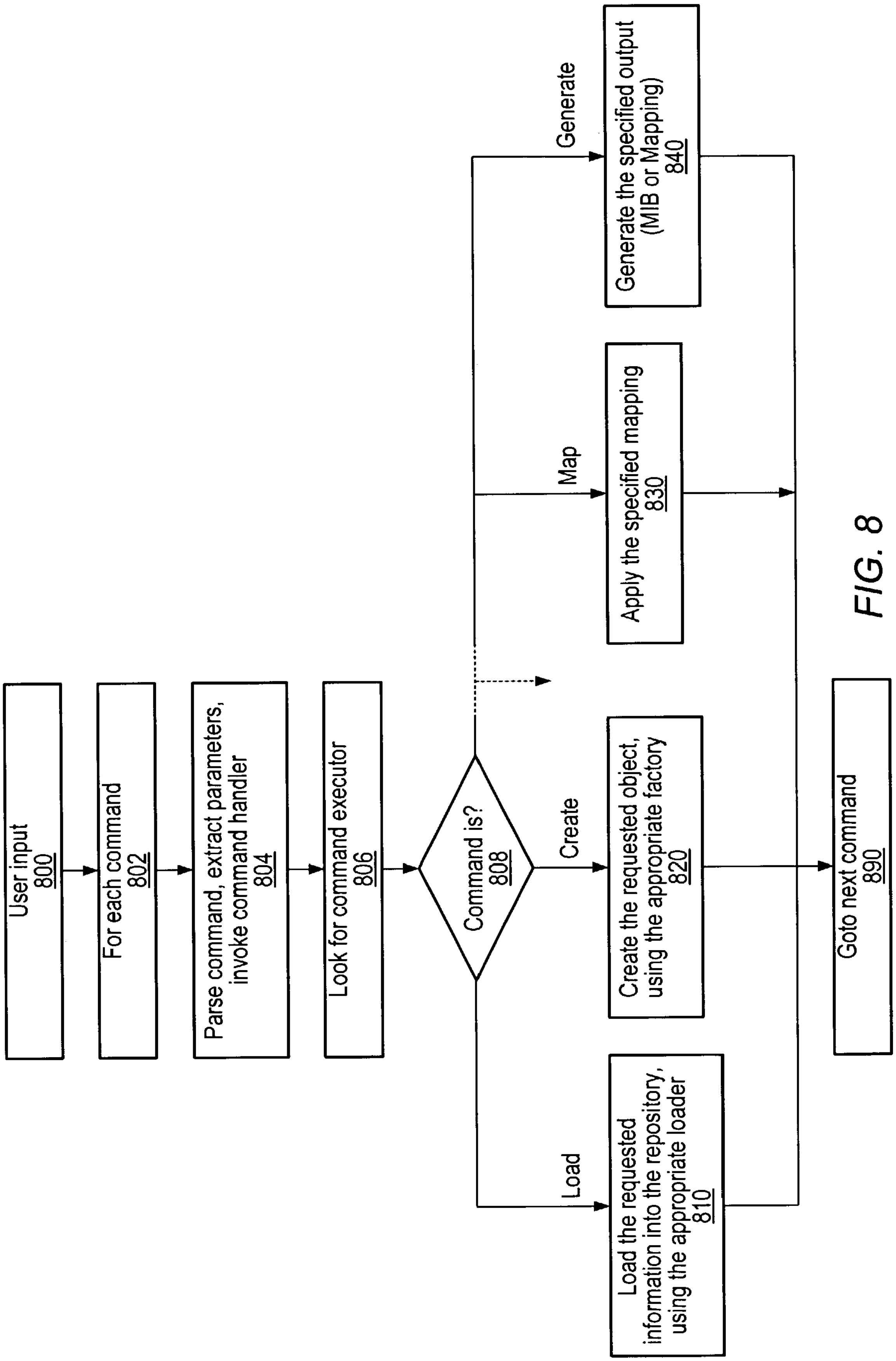
Figure 9:
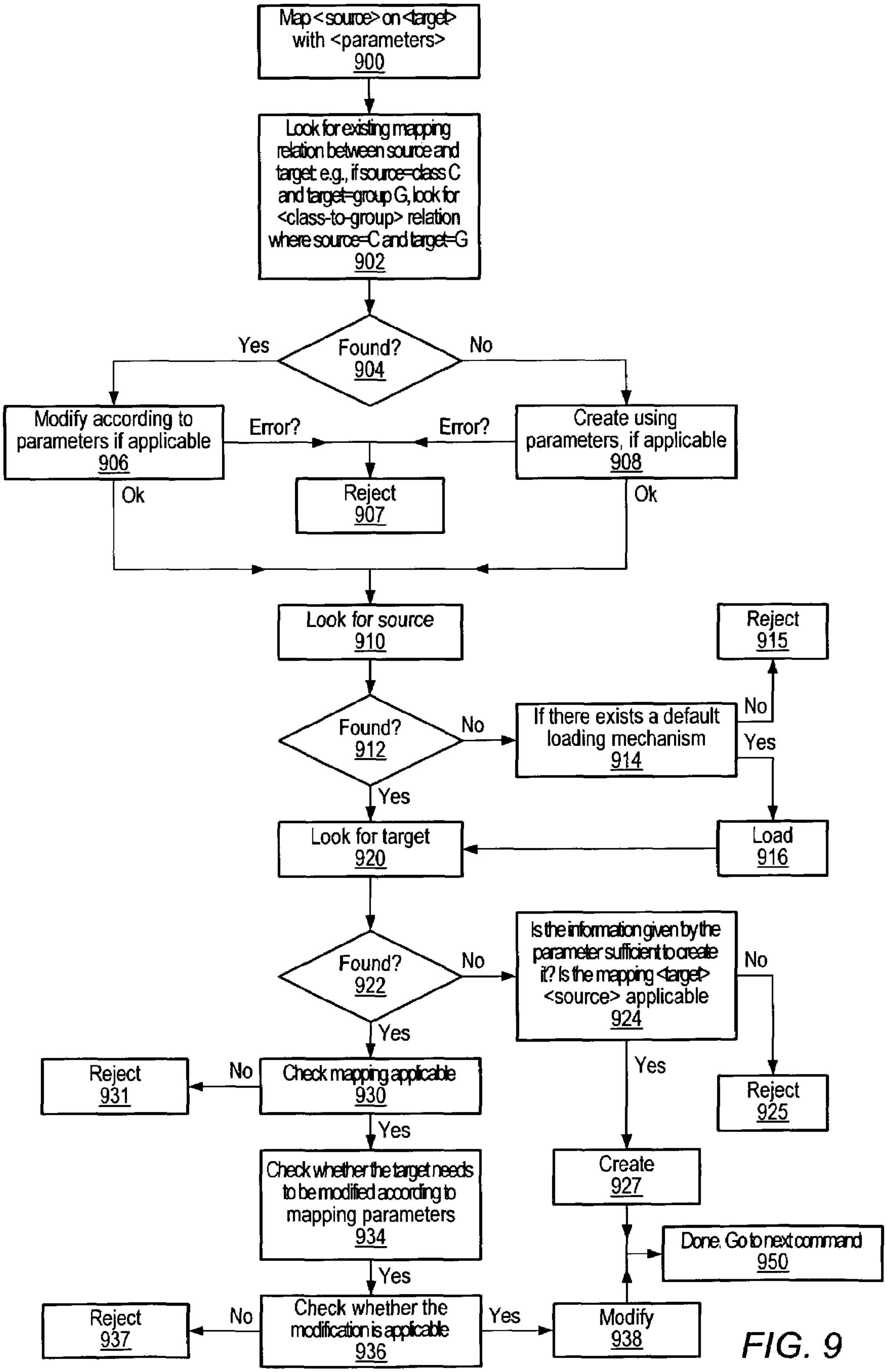

FIG. 6 diagrammatically illustrates an exemplary embodiment of a program for processing the output data of FIGS. 3 and/or 5;

FIG. 7 diagrammatically illustrates an exemplary structure of component 2500 of FIG. 3;

FIG. 8 is a flow-chart showing an exemplary method of operating the component 2500 of FIG. 7; and FIG. 9 is a flow-chart showing an exemplary method of operating the component 2570 of FIG. 7 in more detail.

Additionally, the detailed description is supplemented with the following Exhibits:

- Exhibit EX1 shows an example of a command line input,
- Exhibit EX2 shows an example of an XML mapping, generated from the command line example of Exhibit EX1,
- Exhibit EX3 shows an example of MIB generated from the command line example of Exhibit EX1, and
- Exhibit EX4 is a table of mapping rules.

In the foregoing description, references to the Exhibits are made directly by the Exhibit or Exhibit section identifier: for example, EX1 directly refers to Exhibit EX1. The Exhibits are placed apart for the purpose of clarifying the detailed description, and of enabling easier reference. They nevertheless form an integral part of the description of the present invention. This applies to the drawings as well.

This specification may refer to the Unified Modeling Language, or UML, defined inter alia in Appendix D of the Common Information Model (CIM) specification, available on the web site of the Distributed Management Task Force (DMTF)

http://www.dtmf.org/ or on the web site:

http://www.rational.com/uml or in the corresponding printed documentation.

This specification may also refer to the Java Dynamic Management Kit, or JDMK, which is an embodiment of the Java Management Extensions (JMX specification). Details may be found at http://java.sun.com/products/JavaManagement/

As cited in this specification, Sun, Sun Microsystems, Solaris, Java, EmbeddedJava, PersonalJava, JavaBeans, Java Naming and Directory Interface, JDBC, Enterprise JavaBeans, Jini and Sun Spontaneous Management are trademarks of Sun Microsystems, Inc. SPARC is a trademark of SPARC International, Inc.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright and/or author's rights whatsoever.

Now, making reference to software entities imposes certain conventions in notation. For example, in the detailed description, the quote sign " and/or Italics may be used when deemed necessary for clarity, e.g. to distinguish between a basic object and another object having the same name, for example: a dynamic MBean has a "DynamicMBean" interface.

However, in code examples:

quote signs are used only when required in accordance with the rules of writing code, i.e. for string values.

an expression framed with square brackets, e.g. [,property=value]* is optional and may be repeated if followed by *;

a name followed with [] indicates an array.

Also, <attribute> may be used to designate a value for the attribute "attribute" (or attribute).

The reader is assumed to be familiar with object orientated programming in general, more specifically with Java, still more specifically with JavaBeans. Details may be found at:

http://Java.sun.com for Java http://Java.sun.com/beans/spec.html for JavaBeans and/or in the corresponding printed documentation, e.g. "The Java Language Specification", J. GOSLING, Bill Joy, Guy STEELE, Addison Wesley, 1996, ISBN 0-201-63451-1.

In object oriented programming, an object may comprise properties and methods, together termed [object] members. For convenience, the methods are usually identified by their name followed with ( ). Where a method requires parameters, these are inserted between the two round brackets (unless the parameters are implicit). Most of the methods are directed to the members or internal contents of the object: get( ) for reading a property, set( ) for writing a property, other property-related methods, access-to other methods, etc. . . . .

A method contained in an object may be inter alia public or private, depending upon whether it is accessible (may be invoked) from outside the object, or not.

As known, when using an object oriented programming framework, e.g. Java, defining object structures (properties and methods) is generally sufficient for enabling men skilled in the art to write corresponding executable software. Thus, generally, this specification will mainly present object structure definitions.

Object oriented programming uses "classes", which may serve the following purposes:

objects may be "instantiated" from a class, using an object constructor (in short, a constructor); in Java, a constructor is a method having the same name as the class it belongs to.

a class may "extend" a parent class, thus inheriting the properties and methods of the parent class.

A class termed "abstract" cannot be instantiated, only inherited. A class termed "concrete" may instantiated and/or inherited. A method in a class may also be abstract: this means that the method will have to be defined in any object instantiating that class.

In Java, a given class may have only one parent class, which in turn may inherit ("extend") one parent class, etc. . . . . Other object oriented languages may support multiple inheritance, i.e. a given class may inherit several parents.

However, Java supports a special type of entity, named "interfaces". Interfaces may be viewed as a special form of classes, which may support multiple inheritance. Interfaces may basically contain abstract methods. The word "interface" is used herein to refer to such entities. It covers any similar entities which may be developed in a language other than Java.

A class may "implement" an interface. This means that the class concretely defines the abstract methods existing in the interface.

JavaBeans components (in short Beans) are re-usable software components which can be manipulated visually in a builder tool, e.g. an editor or graphical use interface builder. An example of a builder tool is the Java Development Kit (JDK). Further details about Beans may be found in the abundant literature, for example in a book entitled "Mastering JavaBeans" by Lawrence Vanhelsuwé, published by SYBEX (ISBN 0-7821-2097-0). Beans share certain common defining features, providing:

a set of properties;

a set of methods for performing actions; and support for events and for introspection, also known as reflection, which enable access to the structure of Java objects from outside. The Java Development Kit (JDK) includes a corresponding reflection API.

A JavaBean supports the so-called getter/setter pairs, defined in accordance with lexical design patterns. This is described in detail in the above cited JavaBean documentation, and will now be summarized.

One considers, for a given Bean, all the public methods, the name of which begins with one of the following prefixes:

X "set", e.g. setCurrency( ) or setActive( );

X "get", e.g. getCurrency( );

X Optionally, "is", e.g. isActive( ).

The methods verifying a. are termed setter or mutator methods. The methods verifying b. or c. are termed getter or accessor methods. In fact, the prefix "get" is sufficient to define getter methods; the prefix "is" is optional, and may be used e.g. for booleans where it is more suggestive in English language.

In each case, the method name is "reduced" by removing its prefix "set", "get" or "is". In the above examples, the reduced method names would be currency or active. Generically, the reduced method name is noted <Myname>. Also, <type> denotes the type of an entity, e.g. int[eger], string, bool[ean], etc. . . . , and <Myvalue> designates a value of the entity having the <type>. Formally, the above methods may now be generically represented as follows, in the example of Java code:

void set<Myname>(<Type><Myvalue>)

<Type>get<Myname>( )

Boolean is<Myname>( ).

Where at least one of the above public methods exists for a given Java object, <Myname> is termed an attribute of that object, with the following possibilities:

if there is a setter method set<Myname>( ), then the attribute is writable;

if there is one of the two getter methods get<Myname>( ) or is<Myname>( ), then the attribute <Myname> is readable, and has the type of that method;

an attribute satisfying both conditions is writable and readable.

In fact, the attribute may be a property of the Bean, or not. A property <myname> may conveniently begin with a lower case letter, while a corresponding attribute (<Myname>) begins with an upper case letter. Other naming conventions expanding or replacing the JMX specification may be used.

In other words, whenever a Bean offers a pair of getter and setter methods having the same <Myname>, then they form a getter/setter pair, defining a <Myname> readable and writable attribute of the JavaBean. In practice the expression "getter/setter pair" is usually broadened to mean "getter and/or setter", i.e. to cover also the cases where only a getter method or or accessor method or only a setter or mutator method is present. A getter and/or setter pair constitute accessor/mutator method(s). In the following, the expression "accessor methods" will be used to encompass both accessors and/or mutators.

The field of application is not restricted to the above examples of getter and setter methods. More generally, the invention may apply where a preselected rule enables the following:

- in correspondence with a name, i.e. the attribute name, defining uniquely the names of a read method and/or of a write method associated to that attribute;
- conversely, in correspondence with the names of a read method and/or of a write method, defining uniquely a name, i.e. the attribute name, associated to these methods.

Thus, those of the methods which correspond to a getter and/or a setter method are correctly represented by the corresponding attribute. The read and/or write status of the attribute depends upon whether it corresponds to a getter method, a setter method, or both.

All the other public methods of a Bean which do not belong to a getter and/or setter pair are termed "operations".

In EP-A-909057, it has been proposed to use Beans for managing resources in a computer system, especially a computer network. Beans used for this purpose are termed Managed Beans or MBeans. More generally an MBean may be termed "managed object". In EP-A-909057, it has been generally proposed to provide each MBean with public methods enabling the management of the resource represented by that Mbean.

In order to avoid unduly lengthening this specification, the descriptive contents of patent publication WO 00/77631 are incorporated herein by reference. Generally, the above cited prior patent applications define:

- managed objects or MBeans, a framework for registering MBeans,
- an MBean repository service for storing pointers to registered MBeans, a filtering service enabling selection of MBeans, a metadata service, an access control service, an event service, a relationship service, a dynamic native library loading service, a managed object adaptor server.

Now, managing a resource necessitates that the resource is "instrumented", i.e. that access is enabled to corresponding information on that resource. The instrumentation should obey preselected general rules (e.g. the JMX rules). Thus, in accordance with another definition, MBeans are software objects which implement not only resources, but also the instrumentation of such resources, in accordance with predefined rules. Conversely, the instrumentation of a given resource may be provided by one or more MBeans.

There is defined for each MBean a management interface, comprising:

- attributes, each corresponding to a getter/setter pair of public methods, and
- operations, comprising those of the public methods which do not belong to getter/setter pairs.

Thus, in an example, an MBean may be viewed as a Java object that implements specified interfaces in accordance with specified rules, e.g. specified lexical design patterns. The exposed interface may be controlled: for example, an MBean attribute can allow read-only or read-write access.

An exemplary software management framework may comprise:

- an instrumentation level, comprising "MBeans",
- an agent level, comprising an MBean server and optional Management services,
- a manager level.

In an example, an MBean may be viewed as a Java object that implements specified interfaces in accordance with specified rules, e.g. specified lexical design patterns. The exposed interface may be controlled: for example, an MBean attribute can allow read-only or read-write access.

In an exemplary embodiment (FIG. 1), based illustratively on two Java virtual machines 4M1 and 4M2, implementing the agent level and instrumentation level:

a) the manager level comprises e.g. a JMX-compliant Management Application 1100, a Web Browser 1110, and a Proprietary Management Application 1120;

b) in the "agent level":

- b1) machine 4M1 has an MBean server 2100 having Protocol Connectors or Adaptors 2101, 2102, enabling communication with JMX-compliant Management Application 1100, and Web Browser 1110, respectively. Proprietary Management Application 1120 needs a JMX Manager 1122 to be connected with MBean server 2100 via protocol connector 2103. The agent level may further include a service module 2110;
- b2) machine 4M2 has two MBean servers 2200 and 2300, illustratively provided with Protocol Connectors or Adaptors 2201, 2202, respectively, interconnected with JMX manager 1122.

C) at the "instrumentation level":

- c1) machine 4M1 has objects 3101 and 3102, which are MBeans, i.e. beans registered in MBean server 2100, and a plain JavaBean component 3103, which is a non MBean object, i.e. is not registered in MBean server 2100.
- C2) machine 4M2 has objects 3201 and 3202, registered in MBean server 2200, and objects 3301 and 3302, registered in MBean server 2300.

Figure 4:
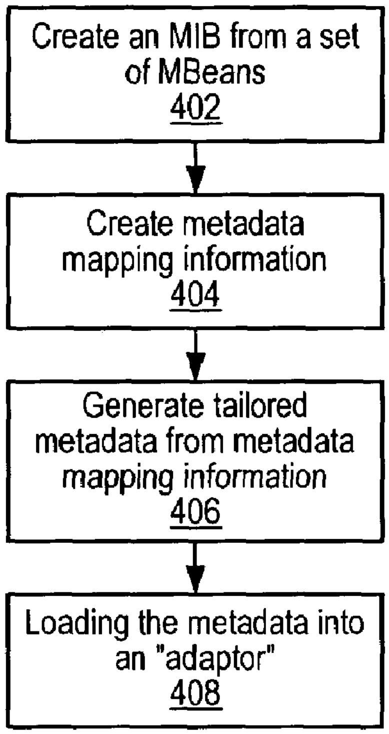
FIG. 4 illustrates a flow-chart of an exemplary method for constructing the management protocol adaptor of FIG. 3.

The MBean objects have a management interface, e.g. 3101-I for MBean 3101 (which is supposed to be a standard MBean). Only the interface label 3101-I is shown in FIG. 4, to avoid too much complexity in the drawing.

The management level may use various management technologies, e.g. SNMP, CMIP, CORBA, WBEM, etc. . . . .

Although the question of remote management has been studied for many years, remote management is still often seen as a challenge. The number of management technologies (SNMP, CMIP, CORBA, WBEM etc. . . . ), the diversity of customer requirements (some will want SNMP, other will want CORBA . . . ), the complexity of these technologies and their fast evolution—yesterday's standards soon becoming obsolete—, lead to the following observations:

- Software architects and developers often want to design applications using object oriented methodology—like for instance the Unified Modeling Language (UML).
- Having an internal Information Model independent from the management protocols is often seen as a must: the application should not be polluted by the protocol through which it will be managed. This way, if the management protocol needs to be changed in order to integrate with new management systems, the core of the application will not have to be replaced.

For example, SNMP (Simple Network Management Protocol) is a widely used management protocol, standardized by a series of internet Request For Comments (RFCs). It may be viewed as composed of two parts:

- the definition of the protocol itself (SNMP v1, SNMP v2, SNMP v3), and
- a specification language:
- the Structure of Management Information (SMI v1, SMI v2), which is used to describe the Management Information Bases (MIBs) that make up the Management Interface of the managed application.

Thus, in addition to the above observations:

SNMP Management consoles are widely used in the industry, and SNMP is often a customer requirement. However, the management interface of an SNMP agent needs to be defined in SMI (v1 or v2).

Usually, expert Java programmers are not SNMP experts. Programmers want to be able to focus on the development of the application itself, and do not want to be bothered by the management sides. In particular, they often find it difficult to understand, or develop, management interface specification using SMI.

The above observations are not restricted to SNMP, and may apply to other management protocols as well, e.g. CIM-WBEM or CMIP (Common Management Information Protocol).

Figure 1:
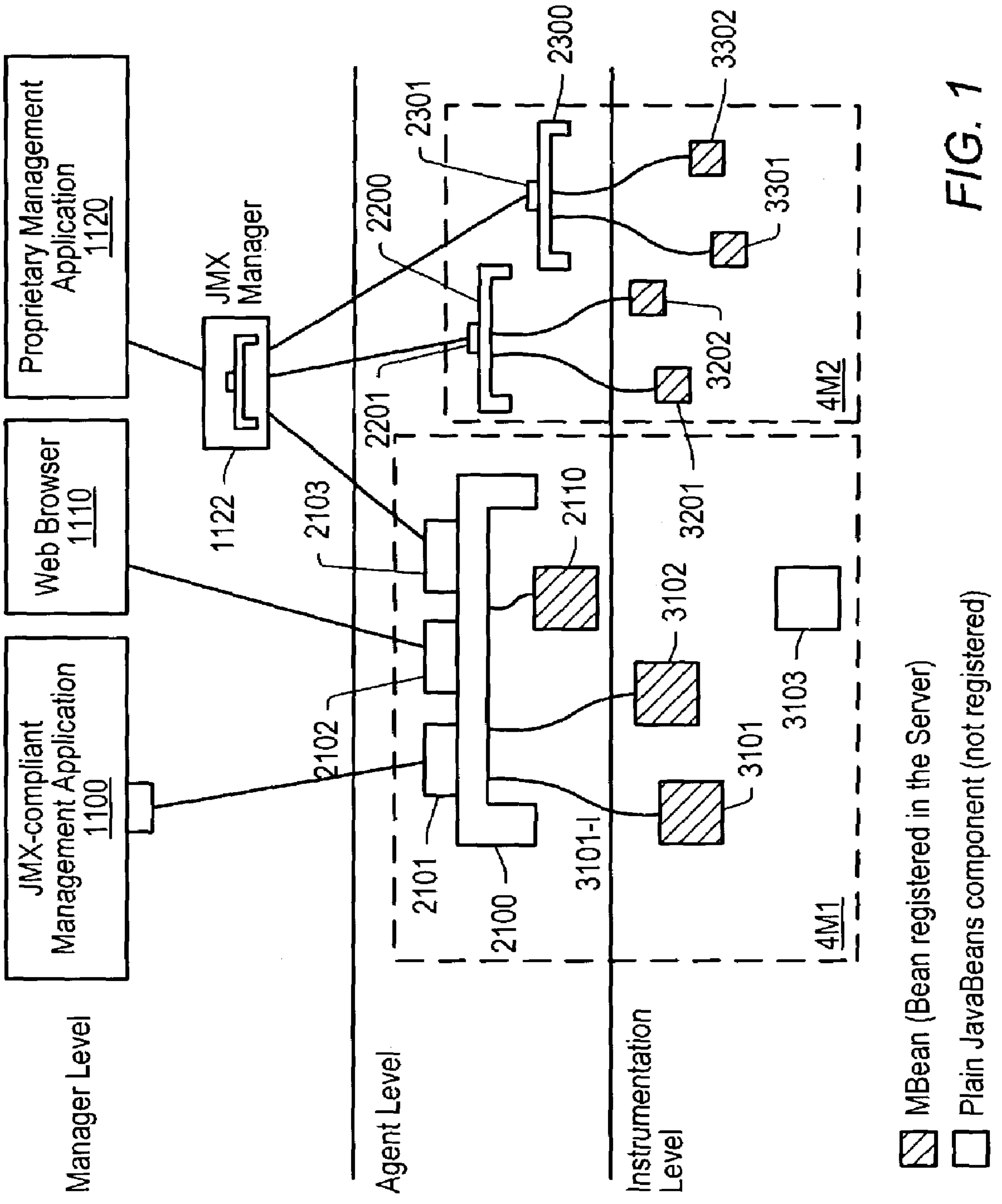
FIG. 1 illustrates an exemplary JMX framework.

This will now be depicted in more detail using the example shown on FIG. 1, with reference to the Java Dynamic Management Kit (an implementation of JMX by the applicant company). Details on the Java Dynamic Management Kit (JDMK) may be found at http://java.sun.com/products/JavaManagement/ or in the corresponding printed documentation.

Figure 2:
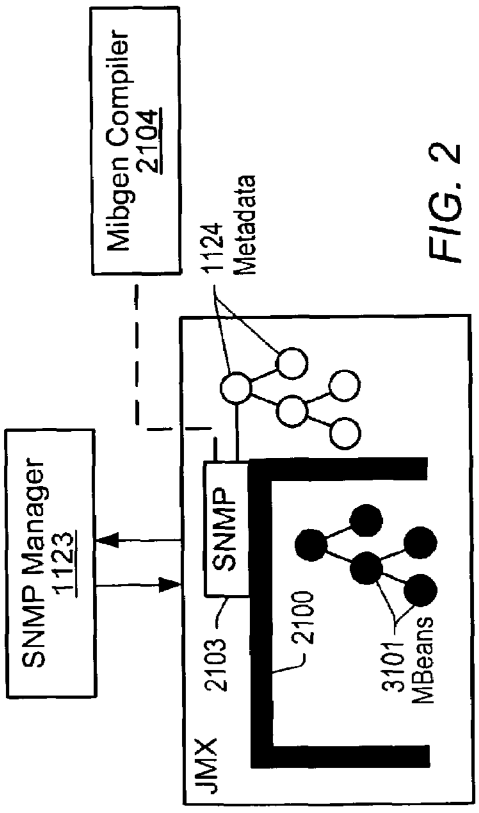
FIG. 2 illustrates an exemplary JDMK implementation of a management protocol adaptor for a JMX framework.

As shown in FIG. 2, the JDMK provides an SNMP toolkit with the following building blocks:

An SNMP Manager API 1123, allowing a JDMK agent 2100 to manage SNMP devices, An SNMP Agent toolkit, allowing to implement JMX SNMP Agents. The SNMP Agent toolkit comprises an SNMP adaptor 2103 and an SNMP MIB compiler 2104.

The MIB compiler 2104 takes as input an SNMP MIB and generates:

metadata classes 1124, that will be loaded into the SNMP adaptor 2103, and MBean interfaces and code skeletons, that will have to be filled with the application code to obtain complete application Mbeans such as 3101.

The metadata classes 1124 make it possible for the SNMP adaptor 2103 to convert SNMP requests into calls to MBeans (e.g. 3101) implementing the generated interfaces.

The metadata may e.g. do (or help to do) the following:

convert SNMP entity names into Java entity names, and/or conversely;

convert SNMP entity types into Java entity types, and/or conversely;

A typical approach using the mibgen compiler is thus as follows:

First, the SNMP MIBs are written, using the SMI (v1 or v2) syntax. This requires a good knowledge of SNMP and related RFCs.

Then, the MIB is fed to the mibgen compiler 2104, which generates the metadata and the Java MBean interfaces that the application MBean must implement in order to be accessed through SNMP.

As obtained, the internal information model (in JMX) is not exactly independent from the protocol (e.g. SNMP), since it has been generated from the MIB. Moreover, the names of generated MBean interfaces and attributes (i.e. the structure of the application) do not exactly correspond to what a Java Programmer would have done if he had designed the application using regular object oriented methodologies, like UML for instance.

In fact, an Mbean interface may be viewed at two levels:

a structure, or skeleton, which is based on the entity names, e.g. attribute names, and contents, i.e. values for such entities.

Managing a software application through a JMX-compliant management system may be viewed as:

i. activating Mbeans whose interfaces meet a given set of criteria , i.e. correspond to a given interface skeleton, and ii. providing such Mbeans with adequate attributes in these interfaces.

Now, an Mbean initially written in Java has a structure or skeleton (SK0) enforcing Java naming rules. Assuming a corresponding SNMP MIB has been written, when that MIB is converted back to Java by mibgen, the converted structure or skeleton (SK1) is based on the SNMP naming policy, and therefore the entity names used in SK1 are different from those initially used in Java (SK0). This makes it difficult, if not impossible, to automatically match the skeletons SK0 and SK1, and therefore to automatically implement operations i. and ii. above.

The currently recommended practice until now is thus:

to hide the generated MBean interfaces, and to hand-code some application specific glue that will link the generated code skeletons to the application Mbeans.

Due to the hand-coding, the effect of SNMP based management rules is deferred in time, while instant SNMP management to JMX applications would be desirable.

This invention proposes another approach, based on existing application Mbeans, more precisely on the interfaces of such Mbeans.

With reference to FIG. 3, there is proposed a "Java to SNMP Mapping" Engine 2500, which receives:

Mbean classes or descriptors 2501A to 2501C, a user input 2502.

The Mbean classes or descriptors 2501A to 2501C may correspond e.g. to existing predefined Mbeans having commonly used management features, and/or to existing Mbeans for an application being considered. The existing MBeans may be:

standard Mbeans written in Java by Java programmers who designed the application to be managed;

Mbeans obtained through UML modeling, using e.g. CIM and/or MOF.

Model Mbeans, defined e.g. using XML descriptors.

The "Java to SNMP Mapping" Engine 2500 (or "mapgen") may be based on a set of mapping rules, corresponding to an MBean to SNMP Mapping. The mapping rules may include, for instance:

Map Java singletons on SNMP Groups

Map Java multiple instances on SNMP Tables

Map Java relations on SNMP tables

The output of the engine 2500 is:

MIBs 2510, and corresponding mapping metadata 2520, which may be expressed e.g. in XML.

When applied to the mibgen compiler 2104, the mapping metadata 2520 become metadata per se 1124.

The metadata may have various forms and/or levels, depending upon the desired sophistication, and/or the desired extent of independency from the management protocol.

Firstly, it has been observed that a simple object model (e.g. in Java) does not contain enough information to generate a valid SNMP MIB. Additional mapping information should be provided in order to make the mapping possible, for example for the object identifiers (OID), and/or similar information, like the object descriptions, etc. . . . .

Thus, a default mapping that minimizes the amount of user provided information may be implemented, for instance generating only the OIDs.

The user input may also be used to provide further information for defining mapping rules.

An approach like the one exemplified in FIG. 3 may thus use a "neutral" representation of the mapping from which everything may be generated (classes, MIB, etc. . . . ). To have a "neutral" representation means that no particular direction should be preferred. XML is interesting, in that such a language is particularly fitted for describing relations between existing objects. Care should be taken that no XML "end" is missing, otherwise, the description would become confusing. Also, a language like XML may simply describe a static mapping. Other languages may be used to offer an easier way to say what should be generated.

Using the exemplary scheme illustrated in FIG. 3, the operations shown in FIG. 4 may be performed, as such or in any equivalent fashion:

402. create an SNMP MIB from a set of existing application MBeans

404. create metadata mapping information,

406. from such metadata mapping information, generating tailored metadata,

408. loading such tailored metadata into an SNMP adaptor.

Since no hand-coding is required, this makes it possible to have instant management access (e.g. through SNMP) to the application MBeans.

Figure 5:
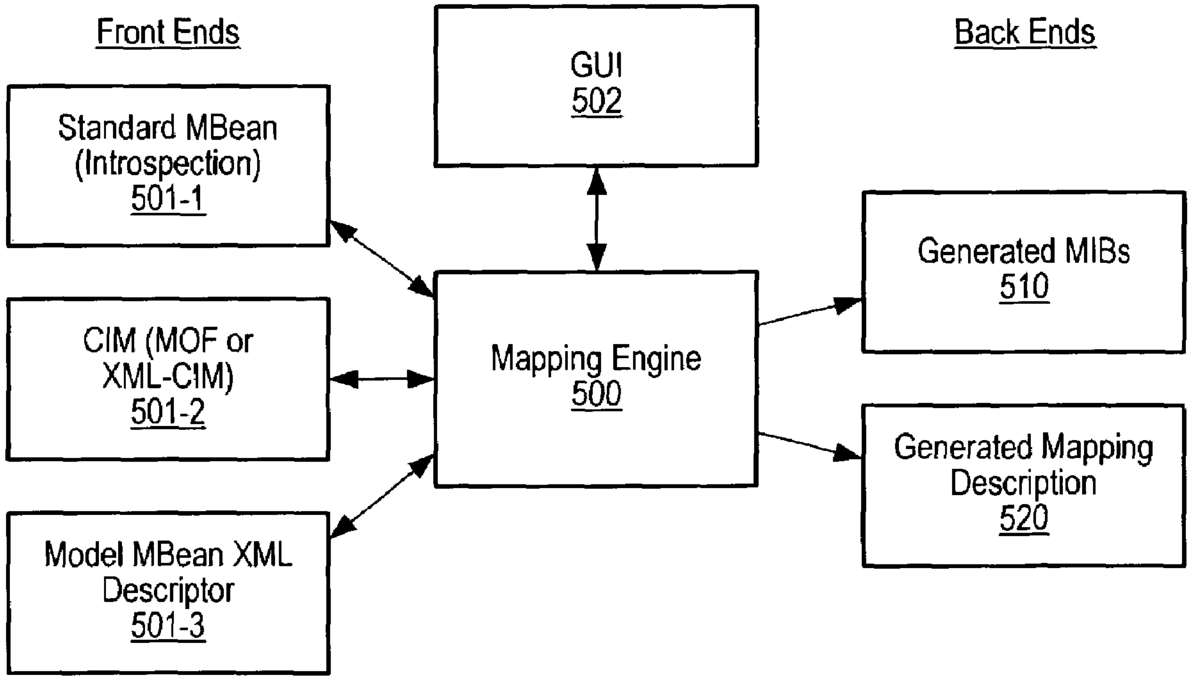
FIG. 5 is a block diagram showing an alternative embodiment of the implementation of FIG. 3.

FIG. 5 shows an exemplary tool in accordance with FIG. 3 in more detail (the reference numerals correspond, the initial "2" in FIG. 3 being omitted). The proposed tool may comprise:

- A series of front-ends 501 for loading class information
  - from standard Mbeans, by Java introspection (501-1)
  - from CIM, e.g. MOF or XML CIM (501-2)
  - from other descriptors (501-3)
- A mapping engine 500 that offers default (optionally, custom) mapping functions,
- A user interface 502 that will issue commands to the mapping engine,
- A series of back-ends that will allow to
  - generate one or more MIBs (510)
  - generate a XML mapping description for each MIB (520).

Front-end 501-2 may use for example, a CIM parser designed from the applicant's company mof2bean component, and/or as described in PCT patent application PCT/IB00/01782, filed Nov. 30, 2000 (title: "Improved manageable object oriented software environment"), and the detailed description of which is incorporated by reference in this application.

Front-end 501-3 may use information derived from the MbeanInfo structure, which is provided in the case of dynamic Mbeans, and/or Model Mbeans. Alternatively, it may use sets of XML descriptors, as defined for such Mbeans in the JMX specification.

When these front-ends are used, the mapping information provided by the JMX descriptor's <protocolMap> clause or the CIM's MAPPINGSTRING clause could be taken into account when constructing the proposed mapping.

A simple version may operate as follows:

inputs on the Mbean (or Java) side:

- Load existing MIB (SMI v1 or SMI v2).
- Load JMX standard MBeans.

mapping features:

- Singleton classes are mapped to groups.
- Multiple instance classes are be mapped to tables.
- Only simple attributes (types) can be mapped (i.e. no mapping of complex attributes).
- Operation are not mapped.
- Relations are not mapped.

Command line input (no GUI). The tool takes as input a command file that provides all the information needed for mapping.

The output is a XML mapping description file and a SNMP MIB

- The SNMP MIB is a SMI v2 MIB
- The XML mapping file describes how this MIB may be mapped to the existing Mbean classes, in particular with regard to name transformation due to SNMP naming constraints.

The tool is also able to load an existing MIB, and a previously generated mapping.

The command line allows the user to specify:

additional information to perform the mapping, and/or how to perform the mapping.

The command line syntax is used to describe a uni-directional mapping. This provides a "natural" way to describe how to generate a MIB from a set of Mbean classes. From these commands, a MIB and a neutral XML mapping description may be generated.

The MIB and mapping description may then be fed to a processing program or metadata compiler, e.g. as shown in FIG. 6. This processing program may be similar with the existing mibgen, as it will be understood. This processing program may generate mapping classes, from the mapping description language. In other words, the mapping description language may be viewed as a means of parameterizing the class generation by the metadata compiler.

In FIG. 6, function 600 comprises a parser 610 of the MIB files 2510, and a parser 620 of the XML mapping files 2520. The input data thus comprise MIB information, and XML information. Then, each parsed MIB (615) is inspected for finding therein SMNP groups and/or SNMP tables (in the example); for any such item found, the XML file is parsed to find potential corresponding XML information.

In more detail, for each SNMP group (630):

- operation 632 looks for customized XML <beans-to-group> relations where target=this group, i.e. involving the particular group name of the SNMP group being considered,
- if one or more such relations are found (634), then a customized mapping is applied in accordance with the found relations (636);
- else, the default mapping as defined by JDMK is applied (650), i.e. the mapping in the existing mibgen program (The existing version of mibgen generates default classes for implementing a MIB. It also generates corresponding default metadata, again starting from the MIB.).

Similarly, for each SNMP table (640):

- operation 642 looks for customized XML <beans-to-table> relations where target=this table, i.e. involving the particular table name of the SNMP table being considered,
- if one or more such relations are found (644), then a customized mapping is applied in accordance with the found relations (646);
- else, the default mapping as defined by JDMK is applied (650), i.e. the mapping in the existing mibgen program.

The operations 630 through 650 and 640 through 650 are shown in parallel for convenience. However, they may be executed serially as well, and/or include common modules, e.g. for 632-634, which are similar to 642-644.

Then, operation 660 uses the mapping, as selected at 363, 646 or 650 to generate metadata1124, and, optionally, MBean skeletons.

It will be appreciated that the metadata compiler (600-660) may be viewed as a modified version of mibgen, in order to take into account the XML mapping file in addition to the input MIBs. Instead, an entirely redesigned compiler having the same functionalities may be used as well.

Exhibit EX1 shows an example of command line input, which may be used to generate an XML mapping. In the example, the set of commands needed to express the mapping may comprise the following set:

load class
create mib
map class <> on group <>
map class <> on table <>
map property
generate mib It has been observed that mapping rules for object properties are only needed if the user wants to provide specific information for that mapping, for example:

- a specific OID arc (an arc is a portion between dots in an OID, e.g. .3. or 4 in 1.2.3.4),
- a specific SNMP type, or
- a specific access mode, etc. . . . .

The rules may be extended by adding optional keyword=value clauses after the with. If needed, new commands can also be added.

The mapping engine will take this command file as input, load the appropriate classes, perform semantic checks (type compatibility etc. . . . ) and compute a mapping base on the given information and a set of default mechanisms. The default mechanisms may operate along the following exemplary rules:

- If no OID arc is given, a new arc is generated.
- If no name is specified for a group, then the name is derived from the name of the class, transforming it as necessary in order to match SNMP naming rules.

Exhibit EX2 shows an example of the generated XML mapping. Those skilled in the art will identify:

- section EX2-0 as an XML heading,
- section EX2-1 as an XML DTD (Document Type Description), and
- section EX2-2 as a body of XML statements exemplifying an application of the rules expressed in the DTD section.

Although the DTD is shown as incorporated in the same file as the XML statements, it may be presented separately as well, since the rules contained in the DTD section are not supposed to change frequently. Also, XML offers other tools for defining rules, e.g. the XML schemas, which may be used instead of the DTD to define the mapping rules. However, presenting the DTD (or equivalent) within the XML files may avoid possible discrepancies in case of revision.

The MIB generated in the example is a valid MIB in SMI v2 syntax. Thus, it can be given as input to the mibgen compiler in order to generate the SNMP metadata classes that, once loaded into the adaptor, will make it possible to access the application MBeans through SNMP.

Exhibit EX3 shows an example of MIB generated from the command line example of Exhibit EX1.

The XML file of EX2, more specifically its DTD, corresponds to a set of mapping rules.

This set of mapping rules is in fact a subset of the rules shown in the table of Exhibit EX4. In fact, the elements enclosed between square brackets [] in EX4 are not applied in the above example; they are intended to show how the XML mapping can be extended to include more complex relations.

Now, the table of EX4 also shows how XML elements can be used to define mapping relations between (a set of) sources and (a set of) targets.

XML elements can thus be categorized into several types:

- Relation: Elements which define mapping relations between (a set of) sources and (a set of) targets.
- Source: Elements that play the source role in relations.
- Target: Elements that play the target role in relations.

Additional elements, such as parameter-list's may be used to provide more information on the mapping relation (e.g.: "automatic=yes" may be used to instruct the mapping entity (mapgen or mibgen) to implement a default mapping).

The mapping rules may be constructed as follows:

- Each relation in the mapping can be further divided into a set of smaller, more specific relations:
  - For instance, the relation that maps a set of MBean classes to an SNMP MIB (beans-to-mib), is further divided into a set of relations that each map a subset of these MBean classes to an SNMP group (beans-to-group),
    - which are themselves further divided into a set of relations that each map a particular MBean class (or part of this class) to that group (class-to-group), etc. . . . .
- The SNMP elements (MIB, groups, tables, entry, variables, etc. . . . ) are part of the mapping target space, and thus appear as targets in the mapping relations:
  - For instance, an SNMP MIB (mib) is the target of a relation that maps a set of MBean classes to an SNMP MIB (beans-to-mib);
  - an SNMP group (group) is the target of a relation that maps a set of MBean classes to an SNMP group (beans-to-group), etc. . . . .
- Conversely, the Java elements (class, attribute, operation, etc. . . . ) are part of the mapping source space, and thus appear as sources in the mapping relations:
  - For instance, an MBean class (class) is the source of a relation that maps (part of) an Mbean class to an SNMP group or an SNMP table (class-to-group or class-to-table), etc. . . . .

The DTD of the produced mapping is generated by the mapgen tools and included into the generated XML mapping (see EX2), so that it can evolve along with the mapping engine. The MIB generator (mibgen) will then have the responsibility to:

- either reject the XML mapping if it can not parse the DTD,
- or use a default mapping (and output warnings) for those elements it does not know how to use yet.

By its portion between square brackets, the table also shows how to make use of the extensibility of XML language in order to define further more complex mappings, such as for instance the operation-to-table mapping relation, which defines how an operation on an MBean can be mapped on a SET on a table.

Consideration is now given to the description "Attribute exposed for management" in EX2 and EX3. It comes from today's JMX limitation, which does not allow a standard MBean to provide its own MbeanInfo. Thus, the MBeanInfo is automatically computed by introspection, which makes it impossible to provide rich description semantics. Alternatively, using XML descriptor's or CIM models as input would make it possible to get a more relevant description.

As shown in FIG. 5, a GUI (Graphic User Interface) may be developed in order to ease the mapping description by the user, instead of the command line input. Such a GUI may implement some or all of the following user input functionalities

- Graphically load new classes
- Create new SNMP MIBs (the output may comprise several MIBs)

- Graphically map a class on a group or a table, and graphically tune the proposed default mapping:
  - choose new values for OIDs,
  - choose custom names for group/table/entries,
  - exclude some properties from the mapping,
  - reduce the access rights from the SNMP MIB (a read/write property could be seen as a read-only variable in the MIB),
  - categorize the kind of object that will provide the MIB implementation: standard MBean, model MBean etc. . . . .
- Load not only Mbean classes, but also existing SNMP MIB (RFCs)
- Specify a non-default mapping between a given standard MIB and a set of already existing Mbeans.

A GUI for handling complex objects is described in PCT patent application PCT/IB00/01702, filed Nov. 17, 2000 (Title: "Graphical user interface enabling entry of non trivial parameters"), whose descriptive portion is hereby incorporated by reference to illustrate how a GUI may handle non-trivial object parameters, and, hence, e.g. specify a user-defined mapping for such objects. A command line user input may be used as well.

The mapping description language (e.g. XML) should be flexible enough in order to allow for storing all that mapping information. The XML language is a neutral representation of the mapping performed (class to MIB or MIB to class) and as such can be used for performing mapping in any direction.

The proposed solution using XML or a similar language gives the following advantages: It is extensible; it provides a strategy for further evolution; it separates the mapping description from the information model (thus inducing no pollution of information model).

Also, it may be based on existing components:
- XML parser code is available, e.g. the JAXP (Java API for XML processing).
- existing code can parse an SNMP MIB, and build its syntax tree. The mibgen component of JDMK includes such a functionality.
- existing code perform introspection of MBeans to obtain an MBeanInfo structure. The proxygen component of JDMK includes such a functionality.

The proposed solution uses a language like XML or similar as a means to describe a customized mapping. The SNMP MIBs are still the main source of input. This reduces the complexity that would be induced by using this description as unique source of input. In this sense, the mapping description is not directly edited by the user but is created along when mapping-orders are issued, either from the command line or from the GUI.

Additionally, the Mapping Definition language, e.g. in XML, may be given a suitable syntax , making it possible to:
- Map existing MIB on existing classes
- Generate classes from MIB
- Generate MIB from classes FIG. 7 shows an exemplary embodiment of mapping engine 2500 of FIG. 3 (or 500 of FIG. 5) in more detail.

A command handler 2540 may process user input:
- as a command line input, through command line interpreter 2542,
- as a GUI, through graphical widgets 2543, which generate corresponding commands.

Upon a "load" command, information loader 2550 may, depending upon the command arguments:
- load Java classes 2501A via class loader 2551,
- load descriptors (e.g. XML) via descriptor loader 2552,
- load MOF files, via CIM loader 2553,
- load existing MIBs, via MIB loader 2555,
- load existing mapping data, via mapping loader 2556.

Upon a "create" command, an object factory 2561 is called, using an MIB factory 2562 if necessary to create an empty MIB object.

Upon a "generate" command, an output generator 2590 is called, using MIB generator 2591 to deliver a MIB file (in SMI v2) corresponding to the MIB object (as filled in by the map operations), and mapping generator 2592 to deliver mapping data, e.g. in XML (e.g. for being later compiled by metadata compiler 2104 (FIG. 3).

Processing a "delete" command (not shown in detail) may be dealt with in a conventional fashion.

A "map" command is processed by the mapping engine per se 2570, as it will be described in connection with FIG. 9.

An exemplary scheme of interaction with the user will now be described in connection with FIG. 8.

A user input 800, e.g. the command file of EX1, is considered.

A "For" structure is shown between operation 802 and operation 890. For each command:
- operation 804 parses the current command, extracts its parameters, and invokes command handler as necessary. This may be made by command line interpreter 2452 of FIG. 7.
- operation 804 looks for a command executor. This may be made by command handler 2450 of FIG. 7. Depending upon what the command is (808):
- for a "load", operation 810 may load the requested information into the repository, using the appropriate loader. This may be made by information loader 2550 of FIG. 7.
- for a "create", operation 820 may create the requested object, using the appropriate object factory. This may be made by factories 2561 and/or 2562 of FIG. 7.
- for a "map", operation 830 may apply the specified mapping. This may be made by the mapping engine 2570 of FIG. 7, exemplified in FIG. 9.
- for a "generate", operation 840 may generate the specified output (MIB and/or mapping). This may be made by the output generator 2590 of FIG. 7.

Now turning to initial operation 900 of FIG. 9, the general form of a mapping command is:

map <source> on <target> with <parameters>

Examples of such mapping commands appear in EX1.

Operation 902 looks for existing mapping relations between the <source> and the <target>. For example, if source=Class C and target=group G, operation 902 looks for a <class-to-group> relation where source=C and target=G.

If a relation is found (904), operation 906 will use it, modified according to the parameters, if applicable. Else, operation 908 will create a mapping relation (target/source), using the parameters, if applicable. An error in operation 906 or 908 will cause a reject 907 (with adequate message).

Then (if not rejected), operation 910 looks for the source. If the source is found (912), operation 920 looks for the target. If both are found, operation 930 checks whether the mapping is applicable, and, if so, operation 934 checks whether the target needs to be modified according to the mapping parameters. If so, operation 936 checks whether the modification is applicable in the context of the map command, in which case the modification is made at 938; unsuccessful checking at 930, 934 or 936 results in rejects like 931 and 937.

Had the source not been found at 912, operation 914 determines whether there exists a default loading mechanism. If so, it is loaded at 916 (see information loader 2550 in FIG. 7). Else, reject 915 is processed. After loading at 916, control is given to operation 920, which has already been described.

Had the target not been found at 922, operation 924 determines whether the information contained in the parameters is sufficient to create it, and, also, if the mapping <target>/<source> is applicable. If so, operation 927 creates the mapping accordingly. Else reject 925 is issued.

The output of 927 or 938 form a valid mapping data section for the current mapping command. This will be repeated for the other commands (950) as necessary.

This way, the command file of EX1 is converted into the mapping data of Exhibit EX2.

"Look" operations like the one of 902 may be viewed as a lookup in a stored representation of a table like the one of Exhibit EX4. Alternatively, each possibility may be hard coded.

This invention is not restricted to the above described examples.

In the example, compiled metadata are generated. They may be applied to a JDMK adaptor, as new management commands for the software platform being managed. Thus, the compiled metadata may be viewed as JDMK executable code. This is important for instant enforcement of the management commands. Where the speed is less important, interpreted metadata might be used as well.

The examples refer to the management of Mbeans. Where Java beans need to be managed, they may be presented as Mbeans. A way of doing this is described in PCT patent publication WO 00/77632, by wrapping a Java Bean within a dynamic Mbean. A model Mbean may be used to store the interface of the dynamic MBean.

This invention also encompasses software code, especially when made available on any appropriate computer-readable medium. The expression "computer-readable medium" includes a storage medium such as magnetic or optic, as well as a transmission medium such as a digital or analog signal. The metadata mapping information and/or the metadata themselves may constitute such code.

Exhibit EX1

```
#
# load definitions from MIB-CORE (not used)
#
load mib
"/usr/project/sabouk/DF/jdmk40.ws/src/share/share/jdmk32examples/
snmp/agent/mib__core.txt"
#load mapping test2.map
# create a new MIB
#
#     o the module name is the given name.
#     o the mib oid is 1.2.3.4 (only dot-notation is supported)
#       o symbolic name of the oid will be mymib (module-name in lower
case)
#
create mib MYMIB oid=1.2.3.4
# Map the class 'Interfaces' on a SNMP group.
#
#     o class Interfaces is autoloaded from CLASSPATH
#     o The name of the group is derived from the name of the class.
#     o automatic=yes => default mapping is applied for all properties
#
map class Interfaces on group automatic=yes
# Map the class 'System' on a group
#
#     o class System is autoloaded
#     o The name of the group will be "system-group"
#     o No propert#
map class System on group system-group
# Map the SysObjectID property on the sysObjectID variable of group
#        system-group, using a specific arc-oid.
#
map property SysObjectID on MYMIB.system-group.sysObjectID arc=10
```

-continued

Exhibit EX1

```
# Map the 'IfEntry' class on a table.
#
#     o The table name is derived from the name of the class (can be
#          customized by providing a table name)
#     o The entry name is derived from the name of the class (can be
#          customized by providing an entry name)
#     o No default mapping for properties (automatic=yes not specified)
#     o The group in which the table will be placed will be 'interfaces'
#       (if not specified, the last group ie: system-group, will be used.
#     o In the index, either the Java name or the SNMP name can be
#       specified (Restriction: if the SNMP name cannot be automatically
#       derived from the Java name, the SNMP name should be used - this
#       is a prototype restriction because the "mapping data" is not yet
#       implemented)
#
map class IfEntry on table group=interfaces index="IfIndex, ifSpecific"
# Apply a default mapping for all the properties of the last class
# (context sensitive: class=IfEntry, snmp-object=ifEntry)
map properties
# Apply default mapping for all the not yet mapped properties of group
# system (Restriction: Both the class and the target object must be
# specified, otherwise the context values will be used - the "mapping
data"
# is not yet implemented).
#
map properties class=System group-system-group
# generates the mib.
#
generate mib MYMIB file=test.mib
# generates the mapping description . . .
generate mapping MYMIB file=test.map
```

Exhibit EX2

```
EX2-0   <?xml version="1.0" standalone="yes"?>
        <!--=========================================
        #   XML Mapping specification for MIB MYMIB
        #=========================================-->
EX2-1   <!DOCTYPE beans-to-mib [
          <!ELEMENT beans-to-mib (mib, beans-to-group*)>
          <!ELEMENT mib (oid?, description?)>
          <!ATTLIST mib name NMTOKEN #REQUIRED>
          <!ELEMENT beans-to-group (group, class-to-group*, beans-to-
        table*)>
          <!ELEMENT group (oid?, description?)>
          <!ATTLIST group name NMTOKEN #REQUIRED>
          <!ELEMENT class-to-group (class, parameter-list?, property-
        to-variable*)>
          <!ELEMENT class (description?)>
          <!ATTLIST class name NMTOKEN #REQUIRED>
          <!ELEMENT beans-to-table (table, class-to-table*)>
          <!ELEMENT table (oid?, index?, description?, entry?)>
          <!ATTLIST table name NMTOKEN #REQUIRED>
          <!ELEMENT entry (oid?, description?)>
          <!ATTLIST entry name NMTOKEN #REQUIRED>
          <!ELEMENT index (variable*)>
          <!ELEMENT class-to-table (class, parameter-list?, property-to-
        variable*)>
          <!ELEMENT parameter-list (parameter*)>
          <!ELEMENT parameter (#PCDATA)>
          <!ATTLIST parameter name NMTOKEN #REQUIRED>
          <!ELEMENT value (#PCDATA)>
          <!ELEMENT property-to-variable (attribute, variable)>
          <!ELEMENT attribute (description?)>
          <!ATTLIST attribute name NMTOKEN #REQUIRED>
          <!ELEMENT variable (EMPTY | (oid?, description?))>
          <!ATTLIST variable name NMTOKEN #REQUIRED>
          <!ELEMENT description (#PCDATA)>
          <!ELEMENT oid (#PCDATA)>
        ]>
EX2-2   <beans-to-mib>
          <mib name="MYMIB">
```

-continued

Exhibit EX2

```
    <oid> 1.2.3.4 </oid>
  </mib>
  <beans-to-group>
    <group name="MYMIB.interfaces">
      <oid> 1.2.3.4.1 </oid>
      <description>
        Information on the management interface of the MBean
      </description>
    </group>
    <class-to-group>
      <class name="Interfaces">
        <description>
          Information an the management interface of the
MBean
        </description>
      </class>
      <parameter-list>
        <parameter name="automatic">
          yes
        </parameter>
      </parameter-list>
    </class-to-group>
    <beans-to-table>
      <table name="MYMIB.ifEntryTable">
        <oid> 1.2.3.4.1.2 </oid>
        <index>
          <variable name="MYMIB.ifIndex" />
          <variable name="MYMIB.ifSpecific" />
        </index>
        <entry name="MYMIB.ifEntry">
          <oid> 1.2.3.4.1.2.1 </oid>
          <description>
            Conceptual row of table ifEntryTable.
          </description>
        </entry>
        <description>
          Information on the management interface of the
MBean
        </description>
      </table>
      <class-to-table>
        <class name="IfEntry">
          <description>
            Information on the management interface of the
MBean
          </description>
        </class>
        <parameter-list>
          <parameter name="automatic">
            yes
          </parameter>
        </parameter-list>
      </class-to-table>
    </beans-to-table>
  </beans-to-group>
  <beans-to-group>
    <group name="MYMIB.system-group">
      <oid> 1.2.3.4.2 </oid>
      <description>
        Information on the management interface of the MBean
      </description>
    </group>
    <class-to-group>
      <class name="System">
        <description>
          Information on the management interface of the
MBean
        </description>
      </class>
      <parameter-list>
        <parameter name="automatic">
          yes
        </parameter>
      </parameter-list>
      <property-to-variable>
        <attribute name="System::SysObjectID">
          <description>
            Attribute exposed for management
          </description>
        </attribute>
        <variable name="MYMIB.sysObjectID">
          <oid> 1.2.3.4.2.10 </oid>
          <description>
            Attribute exposed for management
          </description>
        </variable>
      </property-to-variable>
    </class-to-group>
  </beans-to-group>
</beans-to-mib>
```

Exhibit EX3

```
-------------------------------------------------------
--
--   MIB MYMIB
--
--
-------------------------------------------------------
MYMIB DEFINITIONS ::= BEGIN
      IMPORTS
            mgmt, enterprises, private,
            security, experimental, mib-2,
            IpAddress, TimeTicks, Integer32
            Unsigned32, Counter32, Gauge32,
            Counter64, Opaque, OBJECT-TYPE,
            MODULE-IDENTITY
                  FROM SNMPv2-SMI
            TruthValue, DisplayString, TEXTUAL-CONVENTION
                  FROM SNMPv2-TC;
      mymib OBJECT IDENTIFIER ::= { 1 2 3 4 }
      -- interfaces group
      interfaces OBJECT IDENTIFIER ::= { 1 2 3 4 1 }
      -- system-group group
      system-group OBJECT IDENTIFIER ::= { 1 2 3 4 2 }
      -- interfaces group: object type definitions
      --
      -- ifNumber object type:
      ifNumber OBJECT-TYPE
            SYNTAX Integer32
            MAX-ACCESS read-on
            STATUS current
            DESCRIPTION
                  "Attribute exposed for management"
            ::= { 1 2 3 4 1 1 }
      -- ifEntryTable table definition:
      ifEntryTable OBJECT-TYPE
            SYNTAX SEQUENCE OF IfEntry
            MAX-ACCESS not-accessible
            STATUS current
            DESCRIPTION
                  "Information on the management interface of
the MBean"
            ::= { 1 2 3 4 1 2 }
      -- ifEntry entry definition:
      ifEntry OBJECT-TYPE
            SYNTAX IfEntry
            MAX-ACCESS not-accessible
            STATUS current
            DESCRIPTION
                  " Conceptual row of table ifEntryTable. "
            INDEX { ifIndex, ifSpecific }
            ::= { 1 2 3 4 1 2 1 }
      IfEntry ::= SEQUENCE {
            ifDescr DisplayString,
            ifInDiscards Counter64,
            ifInErrors Counter64,
            ifInNUcastPkts Counter64,
            ifInOctets Counter64,
```

-continued

Exhibit EX3

```
        ifInUcastPkts Counter64,
        ifInUnknownProtos Counter64,
        ifIndex Integer32,
        ifLastChange Counter64,
        ifMtu Integer32,
        ifOutDiscards Counter64,
        ifOutErrors Counter64,
        ifOutNUcastPkts Counter64,
        ifOutOctets Counter64,
        ifOutQLen Counter64,
        ifOutUcastPkts Counter64,
        ifSpecific DisplayString,
        ifSpeed Counter64
        }
-- ifSpecific columnar object type:
ifSpecific OBJECT-TYPE
        SYNTAX DisplayString
        MAX-ACCESS read-only
        STATUS current
        DESCRIPTION
                "Attribute exposed for management"
        ::= { 1 2 3 4 1 2 1 17 }
-- ifOutDiscards columnar object type:
ifOutDiscards OBJECT-TYPE
        SYNTAX Counter64
        MAX-ACCESS read-only
        STATUS current
        DESCRIPTION
                "Attribute exposed for management"
        ::= { 1 2 3 4 1 2 1 11 }
-- ifInDiscards columnar object type:
ifInDiscards OBJECT-TYPE
        SYNTAX Counter64
        MAX-ACCESS read-only
        STATUS current
        DESCRIPTION
                "Attribute exposed for management"
        ::= { 1 2 3 4 1 2 1 2 }
-- ifInOctets columnar object type:
ifInOctets OBJECT-TYPE
        SYNTAX Counter64
        MAX-ACCESS read-only
        STATUS current
        DESCRIPTION
                "Attribute exposed for management"
        ::= { 1 2 3 4 1 2 1 5 }
-- ifOutQLen columnar object type:
ifOutQLen OBJECT-TYPE
        SYNTAX Counter64
        MAX-ACCESS read-only
        STATUS current
        DESCRIPTION
                "Attribute exposed for management"
        ::= { 1 2 3 4 1 2 1 15 }
-- ifOutOctets columnar object type:
ifOutOctets OBJECT-TYPE
        SYNTAX Counter64
        MAX-ACCESS read-only
        STATUS current
        DESCRIPTION
                "Attribute exposed for management"
        ::= { 1 2 3 4 1 2 1 14 }
-- ifInErrors columnar object type:
ifInErrors OBJECT-TYPE
        SYNTAX Counter64
        MAX-ACCESS read-only
        STATUS current
        DESCRIPTION
                "Attribute exposed for management"
        ::= { 1 2 3 4 1 2 1 3 }
-- ifInUnknownProtos columnar object type:
ifInUnknownProtos OBJECT-TYPE
        SYNTAX Counter64
        MAX-ACCESS read-only
        STATUS current
        DESCRIPTION
                "Attribute exposed for management"
```

-continued

Exhibit EX3

```
        ::= { 1 2 3 4 1 2 1 7 }
-- ifMtu columnar object type:
ifMtu OBJECT-TYPE
        SYNTAX Integer32
        MAX-ACCESS read-only
        STATUS current
        DESCRIPTION
                "Attribute exposed for management"
        ::= { 1 2 3 4 1 2 1 10 }
-- ifIndex columnar object type:
ifIndex OBJECT-TYPE
        SYNTAX Integer32
        MAX-ACCESS read-only
        STATUS current
        DESCRIPTION
                "Attribute exposed for management"
        ::= { 1 2 3 4 1 2 1 8 }
-- ifSpeed columnar object type:
ifSpeed OBJECT-TYPE
        SYNTAX Counter64
        MAX-ACCESS read-only
        STATUS current
        DESCRIPTION
                "Attribute exposed for management"
        ::= { 1 2 3 4 1 2 1 18 }
-- ifOutErrors columnar object type:
ifOutErrors OBJECT-TYPE
        SYNTAX Counter64
        MAX-ACCESS read-only
        STATUS current
        DESCRIPTION
                "Attribute exposed for management"
        ::= { 1 2 3 4 1 2 1 12 }
-- ifInNUcastPkts columnar object type:
ifInNUcastPkts OBJECT-TYPE
        SYNTAX Counter64
        MAX-ACCESS read-only
        STATUS current
        DESCRIPTION
                "Attribute exposed for management"
        ::= { 1 2 3 4 1 2 1 4 }
-- ifOutNUcastPkts columnar object type:
ifOutNUcastPkts OBJECT-TYPE
        SYNTAX Counter64
        MAX-ACCESS read-only
        STATUS current
        DESCRIPTION
                "Attribute exposed for management"
        ::= { 1 2 3 4 1 2 1 13 }
-- ifOutUcastPkts columnar object type:
ifOutUcastPkts OBJECT-TYPE
        SYNTAX Counter64
        MAX-ACCESS read-only
        STATUS current
        DESCRIPTION
                "Attribute exposed for management"
        ::= { 1 2 3 4 1 2 1 16 }
-- ifInUcastPkts columnar object type:
ifInUcastPkts OBJECT-TYPE
        SYNTAX Counter64
        MAX-ACCESS read-only
        STATUS current
        DESCRIPTION
                "Attribute exposed for management"
        ::= { 1 2 3 4 1 2 1 6 }
-- ifLastChange columnar object type:
ifLastChange OBJECT-TYPE
        SYNTAX Counter64
        MAX-ACCESS read-only
        STATUS current
        DESCRIPTION
                "Attribute exposed for management"
        ::= { 1 2 3 4 1 2 1 9 }
-- ifDescr columnar object type:
ifDescr OBJECT-TYPE
        SYNTAX DisplayString
        MAX-ACCESS read-only
```

-continued

```
Exhibit EX3

          STATUS current
          DESCRIPTION
                  "Attribute exposed for management"
          ::= { 1 2 3 4 1 2 1 1 }
-- system-group group: object type definitions
--
-- sysServices object type:
sysServices OBJECT-TYPE
          SYNTAX Integer32
          MAX-ACCESS read-only
          STATUS current
          DESCRIPTION
                  "Attribute exposed for management"
          ::= { 1 2 3 4 2 13 }
-- sysObjectID object type:
sysObjectID OBJECT-TYPE
          SYNTAX DisplayString
          MAX-ACCESS read-only
          STATUS current
          DESCRIPTION
                  "Attribute exposed for management"
          ::= { 1 2 3 4 2 10 }
-- sysName object type:
sysName OBJECT-TYPE
          SYNTAX DisplayString
          MAX-ACCESS read-write
          STATUS current
          DESCRIPTION
                  "Attribute exposed for management"
          ::= { 1 2 3 4 2 12 }
-- sysLocation object type:
sysLocation OBJECT-TYPE
          SYNTAX DisplayString
          MAX-ACCESS read-write
```

-continued

```
Exhibit EX3

          STATUS current
          DESCRIPTION
                  "Attribute exposed for management"
          ::= { 1 2 3 4 2 16 }
-- sysDescr object type:
sysDescr OBJECT-TYPE
          SYNTAX DisplayString
          MAX-ACCESS read-only
          STATUS current
          DESCRIPTION
                  "Attribute exposed for management"
          ::= { 1 2 3 4 2 11 }
-- sysContact object type:
sysContact OBJECT-TYPE
          SYNTAX DisplayString
          MAX-ACCESS read-write
          STATUS current
          DESCRIPTION
                  "Attribute exposed for management"
          ::= { 1 2 3 4 2 15 }
-- sysUpTime object type:
sysUpTime OBJECT-TYPE
          SYNTAX Counter64
          MAX-ACCESS read-only
          STATUS current
          DESCRIPTION
                  "Attribute exposed for management"
          ::= { 1 2 3 4 2 14 }
END
------------------------------------------------------------
--   End of MIB MYMIB
------------------------------------------------------------
```

EX4 - Mapping table

| Name | Type | Description | Sub-element | Parent |
|---|---|---|---|---|
| beans-to-mib | Relation | Defines how a set of MBeans will be mapped to an SNMP MIB | mib, beans-to-group* | — |
| mib | Target | Provides information on the MIB being mapped (name, root, OID, description) | — | beans-to-mib |
| beans-to-group | Relation | Defines how a subset of MBeans will be mapped on an SNMP group in the MIB | group, class-to-group*, beans-to-table* [operation-to-table*] | beans-to-mib |
| group | Target | Provides information on the group being mapped (name, OID, description) | — | beans-to-group |
| class-to-group | Relation | Defines how (part of) the specified MBean class is mapped onto (part of) the target SNMP group of the parent relation. | class, parameter-list?, property-to-variable*, | beans-to-group |
| class | Source | Provides information on the class being mapped (name, description), | — | class-to-group \| class-to-table |
| property-to-variable | Relation | Defines how (part of) an MBean property (i.e. an attribute or operation parameter) is mapped on an SNMP variable. | attribute, variable | class-to-group \| class-to-table \| [input-to-variable]\| [output-to-variable] |
| attribute | Source | Provides information of the attribute being mapped. | — | property-to-variable |
| variable | Target | Provides information of the attribute being mapped. | | property-to-variable index |
| beans-to-table | Relation | Defines how a subset of MBeans can be mapped to table entries | table, class-to-table* | beans-to-group |
| table | Target | Provides information on the table being mapped (name, OID, description) | index, entry | beans-to-table, [operation-to-table] |

-continued

EX4 - Mapping table

| Name | Type | Description | Sub-element | Parent |
|---|---|---|---|---|
| class-to-table | Relation | Defines how (part of) the specified Mbean class is mapped onto (part of) the target SNMP table of the parent relation | class, parameter-list?, property-to-variable | beans-to-table |
| index | Target | Defines the variables that make up the table index. These variables must be part of one of property-to-variable subrelations of the table parent relation. | variable* | table |
| entry | Target | Provides information on the table conceptual row (name, description) | — | table |
| [operation-to-table] | Relation | Defines how an operation on a class can be mapped onto a SET on a table. | class, [operation], table, [inputs-to-variable*], [output-to-variable?] | beans-to-group |
| [operation] | Source | Provides information on the operation being mapped. | — | operation-to-table |
| [input-to-variable] | Relation | Defines how an operation input parameter is mapped onto a set of SNMP variables | property-to-variable* | operation-to-table |
| [output-to-variable] | Relation | Defines how an operation input parameter is mapped onto a set of SNMP variables | property-to-variable* | operation-to-table |

The invention claimed is:

1. A computer-implemented method, comprising:

receiving one or more object descriptions of one or more manageable objects, wherein each object description for each manageable object defines one or more attributes and one or more interfaces for the manageable object, wherein the received object descriptions are specified in one or more object description languages;

generating management information in a language for a network management protocol for each of the one or more manageable objects based on the received object descriptions;

generating metadata mapping information corresponding to the generated management information, wherein the metadata mapping information comprises information specifying how the object description for each of the one or more manageable objects is mapped to corresponding management information in the language for the network management protocol; and using the metadata mapping information to construct one or more adaptors for communications between one or management application using the network management protocol and the one or more manageable objects, wherein the one or more adaptors convert requests in the network management protocol to calls to the one or more manageable objects.

2. The method of claim 1, wherein said generating management information comprises generating the management information according to a set of mapping rules for mapping the attributes and interfaces of the manageable objects to the language for the network management protocol.

3. The method of claim 1, wherein the received object descriptions comprise descriptions of one or more JAVA Mbeans.

4. The method of claim 1, wherein the received object descriptions comprise descriptions of one or more objects in an object modeling language.

5. The method of claim 4, wherein the object modeling language comprises Unified Modeling Language (UML).

6. The method of claim 1, wherein the received object descriptions comprise descriptions of one or more objects in an data representation language.

7. The method of claim 6, wherein the data representation language comprises eXtensible Markup Language (XML).

8. The method of claim 1, further comprising receiving user input comprising mapping rules, wherein said generating management information comprises generating the management information based on the mapping rules.

9. The method of claim 1, wherein the generated metadata mapping information comprises information in eXtensible Markup Language (XML).

10. The method of claim 1, further comprising:

generating compiled metadata for each of the manageable objects from the generated management information for each respective manageable object; and using the compiled metadata to construct the one or more adaptors.

11. The method of claim 10, further comprising communicating with an instance of one of the manageable objects through one of the one or more adaptors according to the compiled metadata for the instance of the manageable object.

12. The method of claim 1, further comprising:

generating direction neutral metadata from the generated metadata mapping information, wherein the direction neutral metadata is usable to map the one or more descriptions of the one or more manageable objects to the generated management information and is further usable to map generated management information to the one or more descriptions of the one or more manageable objects;

using the compiled metadata to construct the one or more adaptors; and accessing one or more of the one or more manageable objects via the network management protocol language and via one or more of the one or more adaptors according to the direction neutral metadata.

13. A device, comprising:

a processor; and a memory coupled to the processor, wherein the memory comprises program instruction configured to:

receive one or more object descriptions of one or more manageable objects, where each object description for each manageable object defines one or more attributes and one or more interfaces for the manageable object, wherein the received object descriptions are specified in one or more object description languages;

generate management information in a language for a network management protocol for each of the one or more manageable objects based on the received object descriptions;

generate metadata mapping information corresponding to the generated management information, wherein the metadata mapping information comprises information specifying how the object description for each of the one or more manageable objects is mapped to corresponding management information in the language for the network management protocol; and language use the metadata mapping information to construct one or more adaptors for communications between one or management application using the network management protocol and the one or more manageable objects, wherein the one or more adaptors convert requests in the network management protocol to calls to the one or more manageable objects.

14. The device of claim 13, wherein the program instructions are further configured to generate the management information according to a set of mapping rules for mapping the attributes and interfaces of the manageable objects to the language for the network management protocol.

15. The device of claim 13, wherein the received object descriptions comprise descriptions of one or more JAVA Mbeans.

16. The device of claim 13, wherein the received object descriptions comprise descriptions of one or more objects in an object modeling language.

17. The device of claim 16, wherein the object modeling language is Unified Modeling Language (UML).

18. The device of claim 13, wherein the received object descriptions comprise descriptions of one or more objects in a data representation language.

19. The device of claim 18, wherein the data representation language is eXtensible Markup Language (XML).

20. The device of claim 13, wherein the program instructions are further configured to receive user input comprising mapping rules, wherein as part of said generating management information the program instructions are configured to generate the management information based on the mapping rules.

21. The device of claim 13, wherein the generated metadata mapping information comprises information in eXtensible Markup Language (XML).

22. The device of claim 13, wherein the program instructions are further configured to:

generate compiled metadata for each of the manageable objects from the generated management information for each respective manageable object; and use the compiled metadata to construct the one or more adaptors.

23. The device of claim 22, wherein the program instructions are further configured to communicate with an instance of one of the manageable objects through one of the one or more adaptors according to the compiled metadata for the instance of the manageable object.

24. The device of claim 13, wherein the program instructions are further configured to:

generate direction neutral metadata from the generated metadata mapping information, wherein the direction neutral metadata is usable to map the one or more descriptions of the one or more manageable objects to the generated management information and is further usable to map generated management information to the one or more descriptions of the one or more manageable objects;

use the compiled metadata to construct the one or more adaptors; and access one or more of the one or more manageable objects via the network management protocol language and via one or more of the one or more adaptors according to the direction neutral metadata.

25. A computer accessible storage medium, comprising program instructions computer-executable to implement:

receiving one or more object descriptions of one or more manageable objects, where each object description for each manageable object defines one or more attributes and one or more interfaces for the manageable object, wherein the received object descriptions are specified in one or more object description languages;

generating management information in a language for a network management protocol for each of the one or more manageable objects based on the received object descriptions;

generating metadata mapping information corresponding to the generated management information, wherein the metadata mapping information comprises information specifying how the object description for each of the one or more manageable objects is mapped to corresponding management information in the language for the network management protocol; and using the metadata mapping information to construct one or more adaptors for communications between one or management application using the network management protocol and the one or more manageable objects, wherein the one or more adaptors convert requests in the network management protocol to calls to the one or more manageable objects.

* * * * *